United States Patent [19]

Metcalf

[11] Patent Number: 4,898,265

[45] Date of Patent: Feb. 6, 1990

[54] TORQUE LIMITER

[75] Inventor: Jeffrey D. Metcalf, Albion, Ill.

[73] Assignee: Sundstrand Corporation, Rockford, Ill.

[21] Appl. No.: 148,889

[22] Filed: Jan. 27, 1988

[51] Int. Cl.[4] .......... F16D 67/00; F16D 43/20
[52] U.S. Cl. .......... 192/8 R; 188/134; 192/56 R
[58] Field of Search .......... 192/7, 8 R, 56 R; 188/134, 135

[56] References Cited

U.S. PATENT DOCUMENTS

| | | | |
|---|---|---|---|
| 1,808,008 | 6/1931 | Schmithaus | 192/8 R |
| 2,659,466 | 11/1953 | Ochtman | 192/8 R |
| 2,783,861 | 3/1957 | Jungles | 192/8 R |
| 3,285,377 | 11/1966 | Rasmussen | 192/8 R |
| 3,367,456 | 2/1968 | Bohnhoff | 188/134 |
| 3,542,162 | 11/1970 | Kerr | 188/134 |
| 3,596,740 | 8/1971 | Nau | 188/134 |
| 4,030,578 | 6/1977 | Cacciola et al. | 188/134 |
| 4,176,733 | 12/1979 | Twickler | 188/134 |
| 4,545,470 | 10/1985 | Grimm | 192/56 R |
| 4,597,477 | 7/1986 | Miller | 192/8 R |
| 4,625,843 | 12/1986 | Maltby et al. | 192/8 R |

*Primary Examiner*—Leslie A. Braun
*Assistant Examiner*—Janice E. Chartoff
*Attorney, Agent, or Firm*—Wood, Dalton, Phillips, Mason & Rowe

[57] ABSTRACT

A torque limiter which includes an input shaft and an output shaft coaxial with the input shaft. A ball ramp torque transmitting device is disposed concentrically relative to the shafts. A first spring is axially disposed of the ball ramp device for normally preloading the device. A friction brake assembly is axially disposed between the ball ramp device and the first spring and operatively associated with the output shaft. Pins extend axially through the friction brake assembly for transferring preloading spring force to the ball ramp device. A second spring is disposed on the same side of the friction brake assembly as the first spring and acts on the friction brake assembly. Both springs are mounted about the output shaft whereby the shaft itself carries the loads of the torque limiter.

14 Claims, 1 Drawing Sheet

TORQUE LIMITER

FIELD OF THE INVENTION

This invention generally relates to torque limiting devices and, particularly, to a shock absorbing ball ramp torque limiter.

BACKGROUND OF THE INVENTION

In many aircraft actuation systems it is desirable to limit the amount of torque the actuators are capable of exerting. In modern aircraft systems, high speed air or hydraulic motors are used to drive flaps, landing gear doors, and other power-operated accessories to minimize weight. Torque limiters are used in the event that the flap, door or the like becomes jammed for any reason. However, because of high rotational inertia, the prime moving means or motors can provide an output torque considerably greater than their normal output if a jam occurs in the driven mechanism. Therefore, in order to prevent damage to the driven mechanism in the event of jamming, torque limiting devices are used to limit the output of the power means.

Many torque limiting devices perform the torque limiting function by a ball ramp torque limiter that abruptly brings the system to a halt in the event the torque through the device exceeds a predetermined value. It is desirable to put the torque limiter on as high speed (and low torque) a shaft as possible to keep component sizes to a minimum. Unfortunately, with a high speed torque limiter, torque spikes due to sudden stoppage can become quite large. Therefore, some type of shock absorbing device, such as a rubber torsion member, is required on the grounding member of the device to reduce the torque spike.

Some actuation systems also find it necessary to isolate the motor inertia, as by the use of a slip clutch, from the torque limiter to further reduce loading of the components and minimize weight. It would be advantageous to eliminate the need for a rubber torsion member and a slip clutch, reducing weight and complexity while increasing reliability of the system. Thrust bearings typically utilized with ball ramp torque limiters also add weight and should advantageously be eliminated if possible.

Examples of torque limiting devices, such as for use in aircraft flight controls with flap systems or the like, are shown in U.S. Pat. Nos. 3,596,740 to Nau, dated Aug. 3, 1971, and 4,030,578 to Cacciola et al, dated June 21, 1977. Both of these patents show types of torque limiters which generally are related to the general problems described above. However, the devices are rather complex and do not sufficiently reduce the weight of the systems.

This invention is directed to solving the above problems and satisfying a need for a new and improved, simple, cost effective and low weight torque limiter of the character described.

SUMMARY OF THE INVENTION

An object, therefore, of the invention is to provide a new and improved torque limiting device for use in such applications as flap control systems for aircraft and the like.

In the exemplary embodiment of the invention, the torque limiter includes an input shaft and an output shaft coaxial with the input shaft. A ball ramp torque transmitting device is concentrically disposed relative to the shafts. The ball ramp device includes a first cam plate splined to the input shaft for rotation therewith, and a second cam plate splined to the output shaft for rotation therewith. A friction brake assembly is operatively associated with the output shaft and is disposed axially of the ball ramp device.

One weight reducing feature of the invention is to provide spring means axially of the ball ramp device for normally preloading the cam plates. The brake assembly is axially disposed between the ball ramp device and the spring means. The friction brake is operatively associated with the output shaft and the second cam plate in such a manner that in the event of jamming, relative rotation of the input and output shafts will effect axial displacement of the second cam plate to actuate the friction brake assembly. Pin means extend axially through the friction brake assembly itself for transmitting preloading spring force to the second cam plate. Therefore, the simple pin means obviates prior bearing structures, crossover linkages between the spring means and the ball ramp device, and other extraneous components, since the pin means extend directly through the friction brake assembly.

Another feature of the invention contemplates providing first spring means for preloading the ball ramp torque transmitting device, and second spring means acting on the friction brake assembly. Both of the spring means are mounted about the output shaft whereby the shaft itself carries the loads of the torque limiter, thereby obviating unnecessary housing components which normally carry the spring means, such as in the aforementioned Nau patent.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE PREFERRED EMBODIMENT

Figure 1:
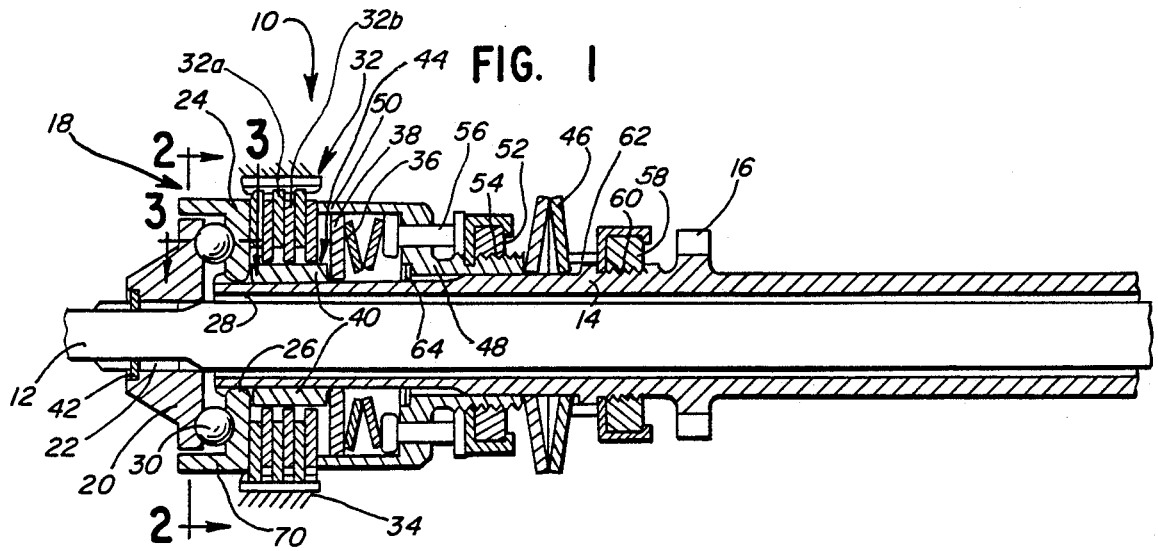
FIG. 1 is a fragmentary axial section through the torque limiter of the invention.
Figure 2:
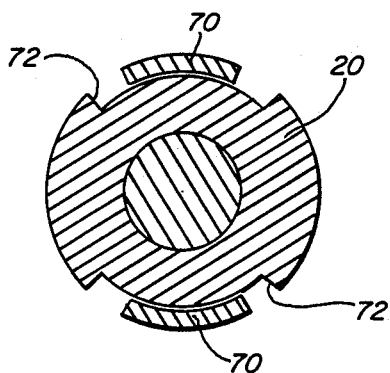
FIG. 2 is an enlarged fragmentary sectional view showing a profile of the cam tracks of the ball ramp torque limiting device.

Referring to the drawings in greater detail, and first to FIG. 1, a torque limiting device, generally designated 10, is designed for use in aircraft actuation systems, such as high speed motor driven systems to drive flaps, landing gear doors, thrust reversers and other power-operated accessories.

Under normal conditions, torque is input to the system through an input shaft 12 and an output shaft 14 including an output gear 16. Input shaft 12 is connected to an appropriate driving unit, such as a high-speed air or hydraulic motor (not shown). Output gear 16 is connected or coupled in a driven system to a flap, door or other accessory (not shown).

Figure 3:
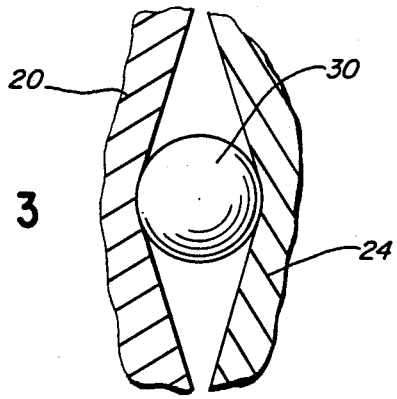
FIG. 3 is an enlarged end view of the ball ramp device as viewed in the direction of line 3—3 of FIG. 1.

Torque is transmitted from input shaft 12 to output shaft 14 through a ball ramp torque transmitting device, generally designated 18. The torque transmitting device includes a first cam plate 20 splined to input shaft 12, as at 22, and a second cam plate 24 splined to output shaft 14, as at 26. A journal bearing 28 is disposed between the shafts. A ball 30 is disposed between cam plates 20 and 24. Actually, a plurality of balls 30 are located angularly about the shafts. The ball ramp construction is somewhat conventional in that the balls fit in ramp pockets between cam plates 20 and 24 as shown by the enlarged depiction of FIG. 3. Torque is transmitted through the balls from the input to the output.

A friction brake assembly, generally designated 32, is of conventional construction and includes a multidisk construction with alternating disks 32a and 32b. The disks alternate, and disks 32a are grounded, as at 34, and disks 32b are splined to output shaft 14.

First spring means are provided for preloading ball ramp torque transmitting device 18. Specifically, preload belleville springs 36 are concentrically disposed about output shaft 14 and bear against a washer 38 which, in turn, biases against a plurality of pins 40. Pins 40 bear against the outside of second cam plate 24, and first cam plate 20 is backed by a spring clip 42 secured about input shaft 12. Therefore, ball ramp device 18 is preloaded as by sandwiching between pins 40 and snap ring 42, with belleville springs 36 providing the preloading.

Pins 40 extend axially of output shaft 14 and are disposed in axial slots 44 cut in the spline connection between the output shaft and brake disks 32b. A plurality of such pins 40 are spaced angularly about the output shaft and are freely movable in slots 40 so that preloading springs 36 can act on ball ramp device 18. In essence, the preload of springs 36 will determine the torque level at which cam plates 20 and 24 will spread axially and take up any clearance built into brake disks 32a,32b. This can be termed the "trip torque".

When torque through the device becomes sufficient to cause force to be developed axially across the brake disks, braking torque will be developed on output shaft 14. This torque increase causes balls 30 to ride up their ramps, further causing more braking force. Second spring means in the form of larger belleville springs 46 are provided for acting on friction brake assembly 32. More particularly, springs 46, like springs 36, are mounted about output shaft 14. Therefore, the shaft itself carries the loads of the device, rather than utilizing extraneous housing components.

Springs 46 act against a yoke member 48 which has a forward portion 50 exerting forces against the disks of friction brake assembly 32.

Both the springs 36 and the springs 46 are adjustable. In particular, an adjusting nut 52 is threaded to yoke member 48, as at 54. The nut moves a rod 56 toward and away from springs 36 to adjust the preloading forces thereof. A second nut 58 is threaded onto output shaft 14, as at 60, for moving a rod member 62 toward and away from springs 46 to adjust the forces of the springs against yoke member 48 which, in turn, acts on the disks of friction brake assembly 32.

From the foregoing, it can be seen that the preload of springs 36 on ball ramp torque transmitting device 18 is accomplished by nut 52 acting through rod 56. In addition, belleville springs 46 are preloaded sufficiently above the preload of springs 36 to maintain pressure on yoke 48 against a locking ring 64, fixed to the output shaft, before tripping of the device. As stated above, when torque to the device becomes sufficient to cause force to be developed axially across the brake disks, braking torque will be developed on output shaft 14. This torque increase causes the balls to ride up their ramps causing more braking force and compressing springs 46. Due to the geometry of the ball ramp, and the braking capacity of the brake, the brake torque will increase at a rate faster than the torque increase across the ball ramps. The brake torque and the ball ramp torque increase is due to the brake slowing down the inertia.

Relative rotation between cam plates 20 and 24 is limited by stop tongues 70 projecting axially from cam plate 24 into notches 72 in cam plate 20. This, in turn, limits axial movement of cam plate 24 and thus limits the force that can be exerted by springs 46. This position is the second stable position of the device that is maintained until input torque drops below the trip torque.

By limiting the force developed across the brake, a known amount of slip will occur before the device stops the system. This slipping absorbs the energy of the system and prevents high shock loading eliminating the need for a slip clutch or other shock absorbing device. In a system with high compliance, the slipping will not add significantly to the trip torque reflected to the actuator's output.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A torque limiter, comprising:

an input shaft;

an output shaft coaxial with the input shaft;

a ball ramp torque transmitting device concentrically disposed relative to said shafts and including a first cam plate splined to the input shaft for rotation therewith and a second cam plate splined to the output shaft for rotation therewith;

spring means axially of the ball ramp device for normally preloading the cam plates;

a friction brake assembly including brake components axially disposed between the ball ramp device and the spring means and operatively associated with the output shaft and the second cam plate in such a manner that in the event of jamming relative rotation of the input and output shafts will effect axial displacement of the second cam plate to actuate the friction brake assembly; and pin means extending axially through the brake components of the friction brake assembly for transmitting preloading spring force to the second cam plate, said pin transmitting means having at least a portion that radially overlaps with at least one of the brake components.

2. The torque limiter of claim 1 wherein said pin means comprise a plurality of pins spaced angularly about the output shaft.

3. A torque limiter, comprising:

an input shaft;

an output shaft coaxial with the input shaft;

a ball ramp torque transmitting device concentrically disposed relative to said shafts and including a first cam plate splined to the input shaft for rotation therewith and a second cam plate splined to the output shaft for rotation therewith;

spring means axially of the ball ramp device for normally preloading the cam plates;

a friction brake assembly comprising a multidisk construction with grounded disks interleaved with disks splined to the output shaft, the friction brake assembly being axially disposed between the ball ramp device and the spring means and operatively associated with the output shaft and the second cam plate in such a manner that in the event of jamming relative rotation of the input and output shafts will effect axial displacement of the second cam plate to actuate the friction brake assembly; and pin means extending axially through the splined disks for transmitting preloading spring force to the second cam plate.

4. The torque limiter of claim 3 wherein said pin means extend through the splined connection of the brake disks and the output shaft.

5. The torque limiter of claim 4 wherein said pin means comprises a plurality of pins disposed about the output shaft and in axial slots cut in the spline connection.

6. A torque limiter, comprising:
an input shaft;
an output shaft coaxial with the input shaft;
a ball ramp torque transmitting device coupled between the shafts and concentrically disposed relative to the shafts;
a friction brake assembly operatively associated with the output shaft and disposed axially of the ball ramp device;
first spring means for preloading the ball ramp torque transmitting device;
second spring means acting on the friction brake assembly; and
both spring means being mounted about the output shaft in operative load transmitting association therewith whereby the shaft itself carries the loads of the torque limiter.

7. The torque limiter of claim 6 wherein said first and second spring means are spaced axially of the output shaft.

8. The torque limiter of claim 6 wherein said ball ramp torque transmitting device is disposed on one axial side of said friction brake assembly, and said first and second spring means are disposed on the opposite axial side of the friction brake assembly.

9. A torque limiter, comprising:
an input shaft;
an output shaft coaxial with the input shaft;
a ball ramp torque transmitting device coupled between the shafts and concentrically disposed relative to the shafts;
a friction brake assembly operatively associated with the output shaft and disposed axially of the ball ramp device;
first spring means for preloading the ball ramp torque transmitting device;
second spring means acting on the friction brake assembly;
both spring means being mounted about the output shaft whereby the shaft itself carries the loads of the torque limiter; and
first and second adjusting means for independently adjusting the forces of the first and second spring means respectively.

10. A torque limiter, comprising:
an input shaft;
an output shaft coaxial with the input shaft;
a friction brake assembly concentrically disposed about the output shaft and operatively associated therewith;
a ball ramp torque transmitting device coupled between the shafts and concentrically disposed relative to the shafts on one axial side of the friction brake assembly;
first spring means for normally preloading the ball ramp assembly and disposed on an opposite axial side of the friction brake assembly;
second spring means acting on the friction brake assembly and disposed on said opposite axial side of the friction brake assembly;
both said spring means being mounted about and in operative load transmitting association with the output shaft whereby the shaft itself carries the loads of the torque limiter; and
means extending axially through the friction brake assembly for transmitting preloading spring force from the spring means to the ball ramp torque transmitting device.

11. The torque limiter of claim 10 wherein said last-named means comprise pin means extending axially through the friction brake assembly for transmitting preloading spring force to the ball ramp torque transmitting device.

12. A torque limiter, comprising:
an input shaft;
an output shaft coaxial with the input shaft;
a friction brake assembly comprising a multidisk construction with grounded disks interleaved with disks splined to the output shaft, the friction brake assembly being concentrically disposed about the output shaft and operatively associated therewith;
a ball ramp torque transmitting device coupled between the shafts and concentrically disposed relative to the shafts on one axial side of the friction brake assembly;
first spring means for normally preloading the ball ramp assembly and disposed on an opposite axial side of the friction brake assembly;
second spring means acting on the friction brake assembly and disposed on said opposite axial side of the friction brake assembly;
both spring means being mounted about the output shaft whereby the shaft itself carries the loads of the torque limiter; and
pin means extending axially through the splined disks of the friction brake assembly for transmitting preloading spring force to the ball ramp torque transmitting device.

13. The torque limiter of claim 12 wherein said pin means extend through the splined connection of the brake disks and the output shaft.

14. The torque limiter of claim 13 wherein said pin means comprises a plurality of pins disposed about the output shaft and in axial slots cut in the spline connection.

* * * * *